June 29, 1937.　　W. E. MACDONALD　　2,085,266
FREQUENCY CONVERTER
Filed Aug. 15, 1935
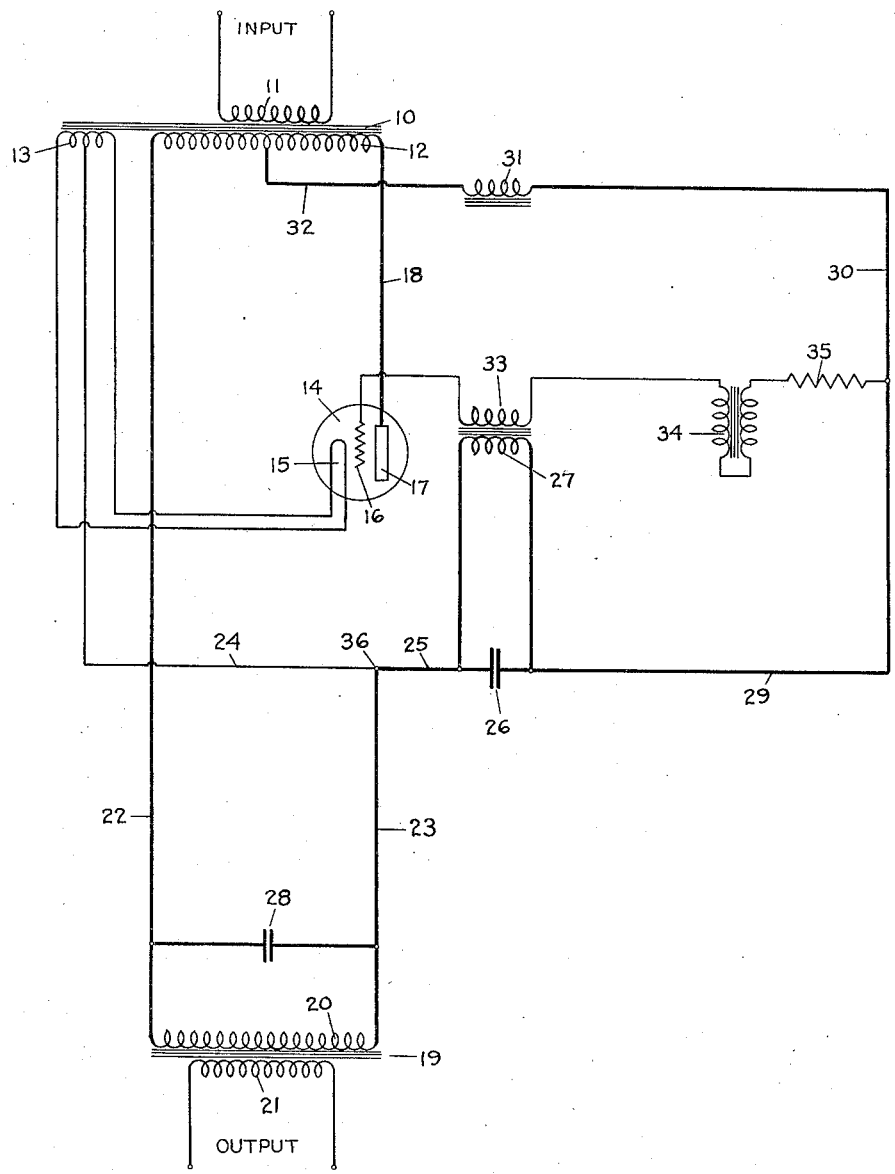
Inventor
W. E. Macdonald
By Emil F. Lange
Attorney Patented June 29, 1937

2,085,266

UNITED STATES PATENT OFFICE 2,085,266

FREQUENCY CONVERTER

William E. Macdonald, York, Nebr.

Application August 15, 1935, Serial No. 36,302

11 Claims. (Cl. 172—281)

My invention relates to a frequency converter and more particularly to a frequency converter for supplying ringing current to operate signaling devices in telephone systems.

In the operation of bells and other signaling devices employed in telephone systems, it is necessary to have an alternating or pulsating current of a relatively low frequency. Due to the fact that the usual commercial power supply is alternating current of too high a frequency to properly operate signaling devices, it is customary to employ some device for converting the current at the frequency supplied to current of the relatively lower frequency needed to operate the signaling devices.

Various types of devices have been employed in the prior art to accomplish this purpose, the most common form of device employed for this purpose being based upon the utilization of mechanical rectifiers, or mechanical rectifiers associated with mechanical vibrators. Due to the heavy current which must be handled by such devices it is necessary that the mechanical rectifiers and vibrators be provided with heavy contact points and be protected by spark condensers. It is further necessary that resistances and choke coils be employed to prevent inductive disturbances in the nearby communication apparatus. Where sufficient resistances and choke coils are employed to completely eliminate the inductive effect between the frequency converter and the communication apparatus, there is a tendency to introduce so much impedance in the circuit that it is impossible to obtain sufficient power to operate the signaling devices. Such devices, moreover, are extremely noisy and hence prevent their use in the same room in which the telephone switch board is installed.

Certain of these devices also have the disadvantage that they are based upon a certain definite frequency of the power supply. Due to the fact that the frequency at the point of generation is not always maintained at a fixed value especially in the case of smaller plants, such devices often fail to operate properly and produce a frequency other than the one most desirable for ringing purposes or they fail completely.

There are frequency converting appliances in the prior art in which no mechanical rectifiers or vibrators are employed. Such devices, however, have the disadvantage that they employ a plurality of thermionic devices, one of which is employed as an oscillator to generate a certain frequency and the other one or more of which are employed as rectifiers. The use of a number of thermionic devices adds greatly to the expense of operation of the converters. In such a case, moreover, a separate direct current supply is employed to operate the oscillator, thus necessitating the use either of batteries which must be periodically replaced or of further expensive rectifying and filtering equipment.

An object of the present invention is to provide a frequency converter in which no mechanical rectifying or vibrating elements are necessary, and in which the frequency supplied by the device is independent of that supplied to it.

A further object of this invention is to provide a frequency converting device in which all of the power for operating the same is derived from the regular commercial alternating current source of power.

A further object of the invention is to provide a frequency converting device in which one thermionic tube functions both as a rectifier and as a generator of a desired frequency.

A further object of this invention is the provision of a frequency converting device which does not introduce objectionable inductive noises in telephone circuits, associated telephone apparatus and radio reception devices, and which thus eliminates the necessity of choke coils, condensers, and similar impedance devices in the apparatus.

Other objects of the invention will be apparent from a consideration of the accompanying description and drawing.

My frequency converter broadly comprises a thermionic tube which is operated entirely by current obtained from a commercial alternating current supply by means of a transformer. The tube is connected so as to provide two plate circuits, one of which contains a circuit tuned to resonance at the frequency ultimately desired and which is inductively coupled with the grid circuit. The other plate circuit is connected across the primary of an output transformer, the secondary of which is connected to the load. Various chokes are employed particularly in the grid circuit to dampen out any high frequency components of the plate current.

My device will be more clearly understood from the following detailed description. Referring to the single figure of the drawing, a combination step-up, step-down transformer is designated by the reference numeral 10, this transformer comprising a primary winding 11, a high voltage secondary winding 12 and a low voltage secondary 13.

A thermionic vacuum tube is designated by the reference numeral 14. This vacuum tube comprises a filament cathode 15, a grid electrode 16, and a plate anode 17. The plate is connected to one end of the high voltage secondary 12 of the transformer 10 by means of a conductor 18. The filament 15 is connected with the opposite terminals of the low voltage secondary 13 and is supplied by this secondary with current to heat the filament.

A step-down transformer 19 constitutes the output transformer and comprises a high-voltage primary 20 and a low voltage secondary 21. The secondary 21 is connected to the load, which in the preferred use of my device, will be a suitable ringing apparatus. One end of the primary 20 is connected through the conductor 22 to one end of the secondary 12. The other end of the primary 20 is connected through conductors 23 and 24 with the mid-point of the secondary 13, which point is at substantially the potential of the filament with respect to the grid and anode. The same end of the primary 20 is also connected through conductors 23 and 25 with condenser 26 and inductance 27. Connected in parallel with the primary 20 is a condenser 28, the function of which will be described later.

Condenser 26 and inductance 27 are connected in parallel and bear such a relation to each other that a resonant condition exists for currents of the desired frequency. The resonant circuit comprising condenser 26 and inductance 27 parallel therewith is connected through conductors 29 and 30 with a choke coil 31, which choke coil is designed to offer a high impedance to the higher audio frequencies. The choke coil 31 is connected through conductor 32 to an intermediate point of secondary 12, which point is shown, for purposes of illustration, as a mid-point.

Grid 16 is connected to one end of an inductance 33, which inductance is coupled to inductance 27 of the resonant circuit. Connected to the inductance 33 is another choke coil 34, which choke coil is designed to offer a high impedance to currents of much greater frequency than that desired in the output circuit. Connected in series with the choke coil 34 is a resistance 35, which resistance is connected through conductor 30, choke coil 31, and conductor 32 with the secondary 12 at the previously mentioned intermediate point.

For the purpose of simplifying the following description, a junction of conductors 23, 24 and 25 is designated by the reference character 36. Since this junction point is at the same potential as the mid-point of the secondary 13, which point, as previously indicated, is at substantially the potential of the filament with respect to the other elements of the tube, point 36 will be treated as though it is at the filament potential, and all circuits will be traced with that assumption in mind.

The following plate circuit may now be traced: from plate 17 through conductor 18, secondary 12, conductor 22, condenser 28 and inductance 20, conductor 23, junction 36, which as previously indicated is at the filament potential, and thence back to plate 17. The following additional plate circuit may also be traced: from plate 17 through conductor 18, through the right-hand portion of secondary 12, through conductor 32, choke coil 31, conductor 30, conductor 29, the resonant circuit comprising condenser 26 and inductance 27, conductor 25, to junction 36 and from there back to the plate.

Upon the energization of primary 11, and the resultant energization of secondaries 12 and 13, an alternating potential will be applied to plate 17. The tube acts as a half wave rectifier and a rectified pulsating current of the same frequency as that of the alternating current supply will flow in both the previously sketched plate circuits. The flow of current through the resonant circuit comprising condenser 26 and inductance 27 in the second mentioned plate circuit causes a voltage to be impressed on the following grid circuit by reason of the inductive coupling between inductances 27 and 33: from grid 16 through inductance 33, choke coil 34, resistance 35, through conductor 30 to the choke coil 31, through conductor 32 to the left-hand portion of secondary 12, conductor 22, inductance 20 and condenser 28, conductor 23, to junction 36 and from there back to the grid.

The inductive coupling between the plate circuit and the grid circuit will tend to cause the tube to oscillate at the frequency to which inductance 27 and capacity 26 are tuned. This causes a flow of current containing a component having the desired frequency, or the one to which the resonant circuit is tuned, to flow in both plate circuits including that one comprising the primary 20 and condenser 28. Due to the fact that the condenser 28 will have a much lower impedance to frequencies higher than the desired one, and the inductance 20 will have a much higher impedance to said higher frequencies, the higher frequency components of the plate current will tend to flow through condenser 28, whereas the lower frequency component, which is of the frequency desired, will largely flow through inductance 20 which, as previously indicated, constitutes the primary of an output transformer 19. As previously stated, the secondary 21 of the transformer is connected to the output load which will normally be the ringing or other signaling devices it is desired to operate.

While the specific values of the various elements form no part of my invention, it being understood that elements of various values can be employed, I have found it satisfactory in a particular case to employ elements of the following values. In the case under consideration, the frequency of the supply was 60 cycles and the desired frequency was 20 cycles. The high voltage secondary 12 produced a potential difference of 700 volts across its terminals. The resistance 35 furnished a resistance of 18,000 ohms. Due to the rather large voltage in the plate circuit, it was found desirable to make condenser 28 able to stand a very high voltage. In this example, a condenser designed to withstand a potential difference of 1,500 volts was found satisfactory. This condenser had a capacity of 0.1 microfarad.

It will be noted that the various impedance elements designed to choke out any higher frequencies that may arise, are located in the grid circuit, where very slight current flow takes place. The presence of these impedance elements does not, accordingly, constitut' such a large energy drain as where the impedance elements are located in the plate circuit.

It will further be noted that the frequency produced is wholly independent of that of the input, the frequency being determined solely by the constants of the resonant circuit.

It will also be noted that my device requires no auxiliary direct current source of power, such as batteries or the like. Moreover, my device combines in one tube the functions of a rectifier and an oscillator.

While I have shown, for purposes of illustration, a specific embodiment of my invention, it will be understood that this is for purposes of illustration only and that my invention is limited only by the scope of the appended claims.

What I claim as my invention is:

1. In a device for converting alternating current at one frequency to current having a different desired frequency, a winding adapted to be energized by a source of alternating current at said first mentioned frequency, a space discharge device comprising a cathode, an anode, and a control grid, an anode circuit including a portion of said winding, a grid circuit connecting said grid and said cathode, said anode circuit having means for inductively coupling said circuit with said grid circuit, and means associated with said first mentioned coupling means to present a low impedance to the flow through the portion of said plate circuit including said means of current of the desired frequency, so as to cause current of the desired frequency to be induced in said grid circuit.

2. A device for converting alternating current at a frequency within the audio range to current at a lower frequency, comprising a winding adapted to be energized by a source of alternating current at said first mentioned frequency, a space discharge device comprising a cathode, an anode and a control grid, a grid circuit including said cathode and said grid, an anode circuit including said anode and said cathode, and a portion of said winding, means for coupling said anode circuit with said grid circuit, said means offering a low impedance to current of said lower frequency, and further means coupling said anode circuit with an output circuit distinct from said previously mentioned circuits.

3. In a device for converting alternating current of a frequency within the audio range to current at a lower desired frequency, a winding adapted to be energized by a source of alternating current at said first mentioned frequency, a space discharge device comprising a cathode, an anode, and a gird, a grid circuit including said cathode and said grid, an anode circuit including said anode, said cathode, a portion of said winding and means for coupling said circuit to said grid circuit, and a second anode circuit including said anode, said cathode, a portion of said winding, and means coupling said circuit with an output circuit distinct from said previously mentioned circuits.

4. In a device for converting alternating current of one frequency to current at a different desired frequency, a winding adapted to be energized by said source of alternating current at said first mentioned frequency, a space discharge device comprising a cathode, an anode, and a grid, a grid circuit including said cathode and said grid, an anode circuit including said anode, said cathode, a portion of said winding and means for coupling said circuit to said grid circuit, and a second anode circuit including said anode, said cathode, a portion of said winding, and means coupling said circuit with an output circuit, said last named coupling means offering a much lower impedance to current of the desired frequency than to current of the first named frequency.

5. In a device for converting alternating current of one frequency to current at a different desired frequency, a winding adapted to be energized by a source of alternating current at said first mentioned frequency, a space discharge device comprising a cathode, an anode, and a grid, a grid circuit including said cathode and said grid, an anode circuit including said anode, said cathode, a portion of said winding and means for coupling said circuit to said grid circuit, said coupling means offering a low impedance to current of the desired frequency, and a second anode circuit including said anode, said cathode, a portion of said winding, and means coupling said circuit with an output circuit.

6. In a device for converting alternating current of one frequency to current at a different desired frequency, a winding adapted to be energized by a source of alternating current at said first mentioned frequency, a space discharge device comprising a cathode, an anode, and a grid, a grid circuit including said cathode and said grid, an anode circuit including said anode, said cathode, a portion of said winding and means for coupling said circuit to said grid circuit, said coupling means comprising an inductance and a condenser parallel therewith and of such value as to be resonant therewith for current of the desired frequency, and a second anode circuit including said anode, said cathode, a portion of said winding, and means coupling said circuit with an output circuit.

7. In a device for converting alternating current of one frequency to current of a lower frequency, a source of current at the first mentioned frequency, a thermionic tube comprising a cathode, an anode, and a grid, a grid circuit comprising said cathode and said grid, an anode circuit comprising said anode, said cathode, and said source of current, means for inductively coupling said anode circuit to said grid circuit, said means offering a low impedance to current of said lower frequency, and means in said grid circuit offering a high impedance to currents of the first mentioned frequency.

8. In a device for converting alternating current of one frequency to current of a lower frequency, a source of current at the first mentioned frequency, a thermionic tube comprising a cathode, an anode, and a grid, a grid circuit comprising said cathode and said grid, an anode circuit comprising said anode, said cathode, and said source of current, means for inductively coupling said anode circuit to said grid circuit, said means comprising an inductance in said grid circuit, a second inductance in said anode circuit and inductively associated with said first inductance, and a condenser in parallel with said second inductance and resonant therewith at said lower frequency.

9. In a device for converting alternating current of one frequency to current of a lower frequency, a source of current at the first mentioned frequency, a thermionic tube comprising a cathode, an anode, and a grid, a grid circuit comprising said cathode and said grid, an anode circuit comprising said anode, said cathode, and said source of current, means for inductively coupling said anode circuit to said grid circuit, said means offering a low impedance to current of said lower frequency, and means coupling said anode circuit to an output circuit, said means comprising a transformer having a primary connected to said anode circuit and a secondary connected to said output circuit, and a condenser parallel with said primary.

10. In a device for converting current of one frequency to current of a different frequency, a thermionic tube comprising a cathode, an anode, and a grid, an input transformer having a primary adapted to be connected to a source of current of said first mentioned frequency, and a secondary, a portion of which is connected in a circuit with said anode and said cathode, a grid circuit including said grid, said cathode and means inductively coupling said grid circuit with said first circuit, an output transformer comprising a primary connected in a circuit including the secondary of said input transformer, said anode and said cathode, and a secondary adapted to be connected to an output load.

11. In a device for converting current of one frequency to current of a different frequency, a thermionic tube comprising a cathode, an anode and a grid, an input transformer having a primary adapted to be connected to a source of current of said first mentioned frequency and a secondary, a portion of which is connected in a circuit with said anode and said cathode, a grid circuit including said grid and said cathode, a coupling transformer comprising a primary in said first circuit and a secondary in said grid circuit, said primary having a condenser parallel therewith and of such value as to cause said condenser and said primary to be resonant at said second mentioned frequency, an output transformer comprising a primary connected in a circuit including the secondary of said input transformer, said anode and said cathode, and a secondary adapted to be connected to an output load.

WILLIAM E. MACDONALD.